United States Patent
Pauliac et al.

(10) Patent No.: US 10,965,657 B2
(45) Date of Patent: Mar. 30, 2021

(54) METHOD TO AUTHENTICATE A SUBSCRIBER IN A LOCAL NETWORK

(71) Applicant: GEMALTO SA, Meudon (FR)

(72) Inventors: Mireille Pauliac, Gemenos (FR); Anne-Marie Praden, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 269 days.

(21) Appl. No.: 15/756,700

(22) PCT Filed: Jul. 5, 2016

(86) PCT No.: PCT/EP2016/065840
§ 371 (c)(1),
(2) Date: Mar. 1, 2018

(87) PCT Pub. No.: WO2017/036638
PCT Pub. Date: Mar. 9, 2017

(65) Prior Publication Data
US 2018/0279123 A1    Sep. 27, 2018

(30) Foreign Application Priority Data
Sep. 4, 2015 (EP) .................................... 15306361

(51) Int. Cl.
*H04W 12/06* (2009.01)
*H04L 29/06* (2006.01)
*H04W 12/04* (2021.01)

(52) U.S. Cl.
CPC .......... *H04L 63/08* (2013.01); *H04L 63/0876* (2013.01); *H04L 63/102* (2013.01);
(Continued)

(58) Field of Classification Search
CPC ............. H04W 12/06; H04W 12/0602; H04W 12/0608; H04W 12/0609; H04L 63/0876; G06F 21/445
See application file for complete search history.

(56) References Cited

U.S. PATENT DOCUMENTS

| | | | | |
|---|---|---|---|---|
| 2003/0014646 A1* | 1/2003 | Buddhikot | ............ | H04L 9/0869 713/184 |
| 2007/0121947 A1* | 5/2007 | Sood | ....................... | H04L 9/321 380/277 |

(Continued)

FOREIGN PATENT DOCUMENTS

| | | |
|---|---|---|
| CN | 101983517 A | 3/2011 |
| GB | 2486461 A | 6/2012 |

(Continued)

OTHER PUBLICATIONS

International Search Report (PCT/ISA/210) dated Aug. 8, 2016, by the European Patent Office as the International Searching Authority for International Application No. PCT/EP2016/065840.
(Continued)

*Primary Examiner* — David J Pearson
(74) *Attorney, Agent, or Firm* — Buchanan Ingersoll & Rooney PC

(57) ABSTRACT

The present invention relates to a method to authenticate a subscriber (IMSIi) within a local network (LNj) comprising preliminary step of deriving a subscriber key (SMKi) in local keys (LKi), one local key (LKiLNj) for each local network (LNj) the subscriber (IMSIi) is authorized to access, provisioning each local network (LNj) the subscriber (IMSIi) is authorized to access with its own local key (LKiLNj). When an authentication is required in a given local network (LNj), an UICC application derives a local key (LKiLNj) in the UICC application of the subscriber (IMSIi) using the network identifier (LNj), the key derivation function (KDF)
(Continued)

and the subscriber key (SMKi) and use the derived local key (LKiLNj) in the algorithm to perform local authentication in the local network (LNj).

5 Claims, 1 Drawing Sheet

(52) U.S. Cl.
CPC ....... *H04W 12/0401* (2019.01); *H04W 12/06* (2013.01); *H04W 12/0609* (2019.01)

(56) References Cited

U.S. PATENT DOCUMENTS

| | | | |
|---|---|---|---|
| 2011/0004762 A1 | 1/2011 | Horn | |
| 2013/0091556 A1* | 4/2013 | Horn | H04W 4/00 |
| | | | 726/4 |
| 2013/0152208 A1* | 6/2013 | King | G06F 21/00 |
| | | | 726/26 |
| 2013/0297937 A1* | 11/2013 | Fransen | H04L 9/0816 |
| | | | 713/170 |
| 2014/0051422 A1* | 2/2014 | Mittal | H04W 12/04 |
| | | | 455/419 |
| 2016/0165432 A1* | 6/2016 | Dubesset | H04W 76/12 |
| | | | 455/433 |
| 2017/0055153 A1* | 2/2017 | Fransen | H04W 48/08 |

FOREIGN PATENT DOCUMENTS

| | | |
|---|---|---|
| WO | WO 2006/108907 A2 | 10/2006 |
| WO | WO 2014/067543 A1 | 5/2014 |

OTHER PUBLICATIONS

Written Opinion (PCT/ISA/237) dated Aug. 8, 2016, by the European Patent Office as the International Searching Authority for International Application No. PCT/EP2016/065840.

Office Action dated Jun. 30, 2020, by the Chinese Patent Office in corresponding Chinese Patent Application No. 201680050928.8. and brief summary provided to the client by Chinese associate. (12 pages).

* cited by examiner

METHOD TO AUTHENTICATE A SUBSCRIBER IN A LOCAL NETWORK

FIELD OF THE INVENTION

The present invention relates to a method to authenticate a subscriber within a local network, without requiring online communication between this local network and the home network of the subscriber.

A local network is defined as a network distinct from the home network in which the subscriber is registered.

The invention also pertains to an authentication center of a home subscriber server (HSS) hosted by a home operator and to an UICC application.

BACKGROUND OF THE INVENTION

3GPP addresses new scenarios where the operator's subscriber shall be authenticated within local E-UTRAN network (4G), without communication with the home network. The scenarios are for commercial use or for public safety, notably when the macro network is not available.

The operator has interest in keeping the control of the authentication of his subscriber within local networks. The subscriber should not be allowed to be authenticated within a local network deployed without agreement with the home operator of the subscriber.

Solutions to authenticate a subscriber within any local network relying on one unique key shared between the home HSS, the UICC application and all the local networks may have a security issue in case that a local HSS would be hosted in less secure environment than the home HSS. In such a scenario, it may happen that an attacker could have physical access to the local HSS and retrieve the unique key used to authenticate the subscriber. Consequently, all the other local networks using the same key to authenticate the subscriber would be known.

A synchronization issue may also exist, in case of 3GPP authentication, there is the use of Sequence Number (SQN) mechanism. Using the same SQN within different local networks not connected to synchronize could end in de-synchronization of the UICC in some scenarios. Then authentication could fail and additional process may be required.

Further alternative and advantageous solutions would, accordingly, be desirable in the art.

SUMMARY OF THE INVENTION

The present invention aims at proposing a novel scheme of authentication where no on-the-fly communication between the local and the home network occurs.

The present invention is defined, in its broadest sense, as a method comprising the preliminary steps of, for a home authentication center (AuC) of a home subscriber server (HSS) hosted in a home network:
  storing a subscriber key (Kmacro) per subscriber in the home authentication center, said home authentication center having a key derivation function (KDF) and said subscriber key being dedicated to the authentication of this subscriber within any local network having an agreement with the home operator,
  deriving the subscriber key in local keys, one local key for each local network the subscriber is authorized to access,
  provisioning each local network the subscriber is authorized to access with its own local key,
  provisioning an UICC application of the subscriber with the subscriber key and the key derivation function (KDF),
  provisioning the UICC application of the subscriber with an algorithm to perform local authentication, said method further comprising the steps of, when an authentication is required in a given local network, for the UICC application:
  receiving a network identifier,
  deriving a local key in the UICC application of the subscriber using the network identifier of the local network, the key derivation function and the subscriber key,
  using the derived local key in the algorithm to perform local authentication in the local network.

This invention relies on the generation of local keys, both in the operator network and in the user equipment of the operator's subscriber, to perform AKA authentication of the subscriber within a local E-UTRAN network.

The home network sends a local key to any local E-UTRAN network where a subscriber is authorized to be present and could be authenticated locally thanks to AKA authentication. One local key is dedicated to only one local network.

The invention allows an operator to continue using AKA algorithm to authenticate his subscribers within local networks. It thus allows the home operator to keep control within local networks. The authentication takes place only if the local authentication center AuC and the user equipment are provisioned with keys provided by the home operator. The use of local keys, specific to only one local network, provides a high level of security. This feature is important in case that a local authentication center AuC would be more vulnerable to attacks, than a home authentication center AuC, including the one in the local HSS. If an attacker has access to one local authentication center AuC, the retrieved local keys could not be used for authentication within others local networks.

The invention has also the advantage to allow local authentication based on symmetric keys. It further guarantees that UICC-based authentication will take place when the subscriber is within local networks. Since AKA-based authentication shall be hosted in a UICC, while certificate-based solutions can be hosted in the terminal part of the user equipment.

The authentication method used in the local network, i.e. AKA authentication with AUTN, RAND, can be the standard one and no modification are needed neither within the local network, neither in the UICC.

The UICC will only contain additional files or dedicated application to store the new subscriber key and all the derived local keys for all local networks.

Associated OTA services are advantageously implemented to update the list of authorized local networks.

According to an advantageous feature, said method comprising, as a preliminary step, a step of, for the authentication center, provisioning the UICC application of the subscriber with a list of identifiers of local networks where the subscriber is authorized to access, and, when an authentication is required in a given local network, for the UICC application, a step of checking the presence of the local network's identifier in the list.

With this feature it is necessary for the UICC application to further contain the list of authorized local networks where the subscriber would be authorized to be present.

According to an advantageous implementation, once the local key is derived by the UICC application, the method further comprises the step of storing the local key for this local network and the step of checking the presence of a stored local key for the local network's identifier.

This feature avoids to re-iterate the key derivation each time the UICC enters a local network.

According to a specific implementation, the authentication process using a sequence number mechanism, it further comprises the step of, for the authentication center and for the UICC application, while deriving local keys, associating an local array of sequence numbers to each derived local key.

Such an array of sequence numbers is typically associated to some standard authentication process. The invention is fully compatible with such standards.

The invention further relates to an authentication center of a home subscriber server hosted in a home network, said authentication center storing a subscriber key per subscriber application, said subscriber key being dedicated to the authentication of a subscriber within any local networks having an agreement with home network's operator, said authentication center having a key derivation function to derive the subscriber key in local keys, one for each local network the subscriber is authorized to access, said authentication center having provisioning resources to provision each local network the subscriber is authorized to access with its own local key, and to provision UICC of subscriber with own subscriber key, with key derivation function (KDF) and with an algorithm to perform local authentication.

Such an authentication center enables the implementation of the invention on the side of the home network.

The invention at last relates to an UICC application provided with a subscriber key, said subscriber key being dedicated to the authentication of a subscriber within any local networks having an agreement with the home network, a key derivation function (KDF) and an algorithm to perform local authentication, said UICC application being further adapted to receive a network identifier from a local network and to use this network identifier, the key derivation function and the subscriber key to derive a local key in the UICC application of the subscriber, the UICC application further being adapted to use the derived local key in the algorithm to perform local authentication in the local network.

Such an UICC application enables the implementation of the invention on the user equipment side.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
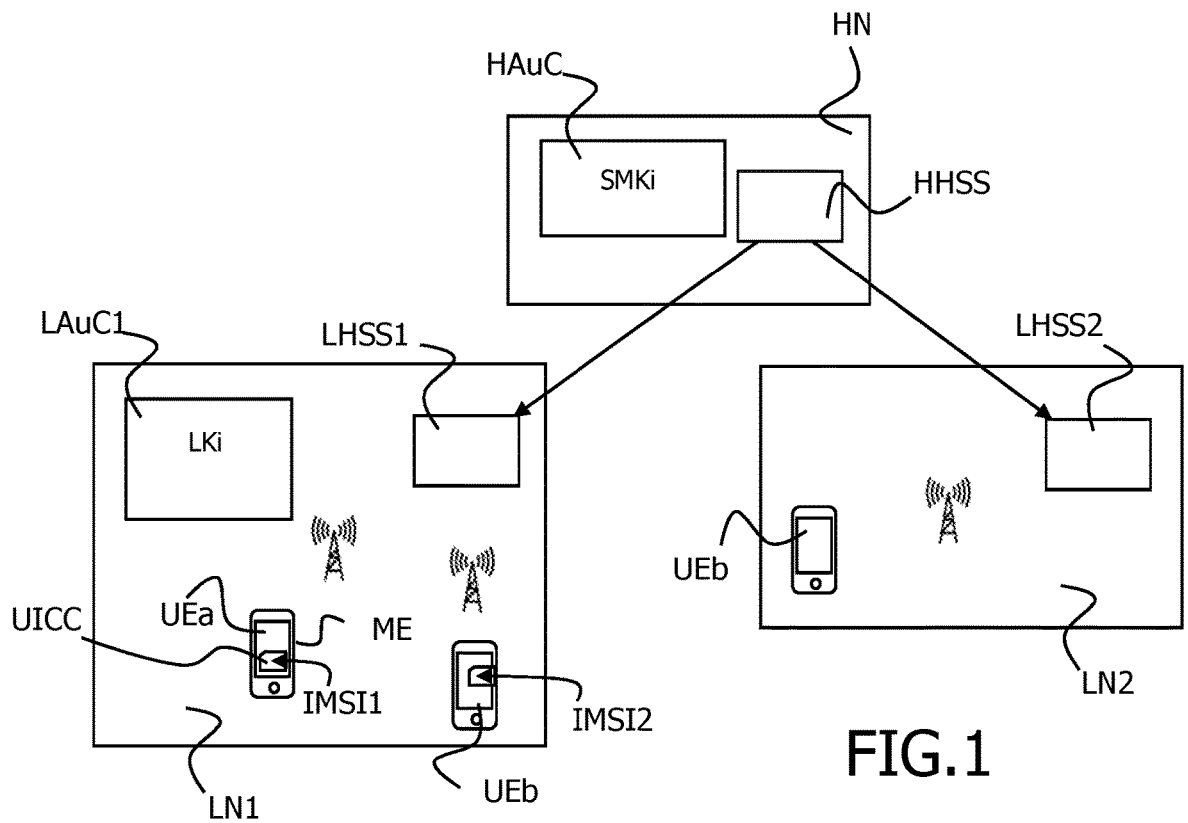
FIG. 1 represents the environment in which the invention is implemented.

For a more complete understanding of the invention, the invention will now be described in detail with reference to the accompanying drawings. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

FIG. 1 schematically shows an environment comprising a home network HN and two local networks LN1 and LN2. Each of them has a respective home subscriber server HHSS, LHSS1 and LHSS2 and an authentication center HAuC, LAuC1, LAuC2. HSS are accessible for base stations in their corresponding local networks.

It is here noted that a user equipment UE consists of an UICC having UICC Application with IMSIi associated to the subscription of the user and a mobile equipment ME. IMSIi is an identifier of the subscriber for one specific UICC Application. If several UICC applications are present in the UICC, each UICC application can have a dedicated IMSI. Nothing prevents to have several UICCs within a UE.

User equipments UEa and UEb respectively have IMSI1 in a UICC application and IMSI2 in UICC application, said IMSIi originating from home network HN. It is here further noted that reference "IMSI" is used to designate the identity of the subscriber according to the UMTS terminology. Any other kind of identity is concerned as IMPI (IMS) and others.

User equipments UEa and UEb are susceptible to enter in communication with base stations of local networks LNj for example in a situation where the UEa and UEb can no longer communicate with normal network. In such a situation, the subscriber needs to be authenticated within the local network LNj without any contact with the home operator.

For this purpose, the invention proposes that the authentication center HAuC of the home network HN stores preliminarily a subscriber key SMKi per subscriber i, and possibly a random value RANDi to be optionally used in the derivation function. Said subscriber key SMKi is dedicated to the authentication of the subscriber associated to the IMSIi in a UICC application within any local network having an agreement with the home operator HN.

According to the invention, the authentication center AuC has a key derivation function to derive local keys from the subscriber key SMK. A local key $LKi_{LNj}$ per local network LNj having an agreement with the home operator is thus obtained. This local key $LKi_{LNj}$ is then sent to the HSS of the concerned local network LNj as shown on FIG. 2 for local network LN1. A local key is sent for each subscriber i susceptible and authorized to enter in local network LNj. The local authentication center LAuCj stores all these local keys $LKi_{LNj}$.

In case of 3GPP AKA authentication, the AuC of the home HHSS sends to the local HSS LHSSj the array of Sequence Number (SQN) associated to each local key LK. It stores all these keys, one per subscriber and, in case of 3GPP AKA authentication, the local authentication center LAuC also contains the array of Sequence Number (SQN) associated to each local key LK.

The subscriber key SMKi, the derivation function KDF, an algorithm to perform local authentication, e.g. 3GPP AKA authentication (Milenage), and possibly the random value RANDi, are then provisioned at the UICC of the user equipment UEa, in an UICC application with IMSI1. This step ends the preliminary steps PrS of the invention which necessitates dedicated communications with the UICC of the subscriber IMSIi when it is in the field of the home network.

Further, the UICC application contains a list of local networks LNj where the subscriber i is authorized to be. The operator of the home network could update this list of authorized local network when the UE with UICC containing the UICC application with IMSIi was or is again in the field of home network.

Figure 2:
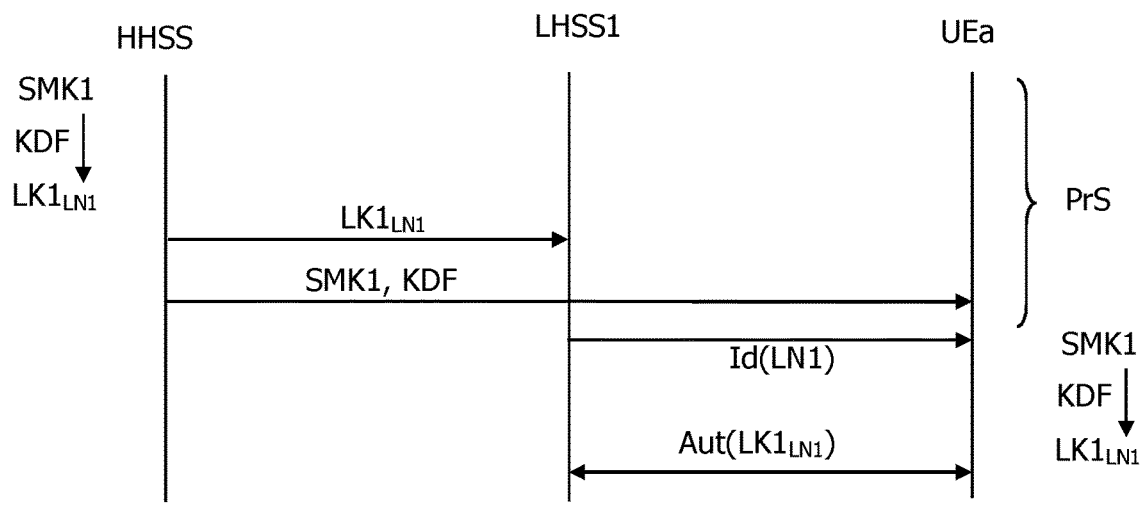
FIG. 2 shows a functional diagram of the exchanges between entities according to the method of the invention.

Then, when the local network LN1 initiates a mutual authentication with the UICC application with IMSI1 of the user equipment UEa in the local network, LN1 in FIG. 2, the user equipment UEa receives a local network identifier Id(LN1) that it provides to the UICC application with IMSI1, e.g. USIM.

When the identifier Id(LN1) is not in the list of authorized networks, the authentication fails. When the identifier Id(LN1) is in the list of authorized networks, selection of the corresponding local network key $SMK1_{LN1}$ and the activation of the derivation function KDF to obtain the local key $LK1_{LN1}$ for the identified local network LN1 are triggered.

The invention can be implemented in such a way that, if a local key has already been derived for the user equipment, the local HSS LHSS1 keeps the local key in memory. In this case, when the network is listed, the UICC application subsequently checks if a local key was previously calculated. In such a case, the derivation is not done again and the stored local key associated to the concerned network is used.

Otherwise, the derivation is in fact triggered. Each local key is specific per subscriber to one local network. The derivation of the local key is linked to the identity IMSI1 of the subscriber and the identity of the local network Id(LN1), thus:

$LK1_{LN1}$=KDF (SMK1, "local-aka", RAND1, IMSI1, Id(LN1)).

The obtained local key can be stored depending on the implementation. In case of AKA-based authentication, as specified by 3GPP, an array of Sequence Number (SQN) is associated to each local key LK.

The local key $LK1_{LN1}$ is then used in secure authentication Aut($LK1_{LN1}$) with the LHSS1 of the local network LN1. AKA authentication is preferably used.

According to the invention, the UICC application stores the following triplets:

Id(LNj), $LK1_{LNj}$, SQNj for as many j as concerned networks.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method to authenticate a subscriber within a local network comprising the preliminary steps of, for a home authentication center of a home subscriber server hosted in a home network:

storing a subscriber key per subscriber in the home authentication center, said home authentication center having a key derivation function and said subscriber key being dedicated to the authentication of this subscriber within any local network having an agreement with the home operator, deriving, by the home authentication center and using the subscriber key, local keys, one local key for each local network the subscriber is authorized to access, provisioning each local network the subscriber is authorized to access with its own local key, provisioning a UICC application of the subscriber with the subscriber key and the key derivation function, provisioning the UICC application of the subscriber with an algorithm to perform local authentication, said method further comprising the steps of, when an authentication is required in a given local network, for the UICC application:

receiving a network identifier, deriving a local key in the UICC application of the subscriber using the network identifier of the local network, the key derivation function and the subscriber key, wherein the authentication process uses a sequence number mechanism, and for the authentication center and for the UICC application, while deriving local keys, associating a local array of sequence numbers to each derived local key, using the derived local key in the algorithm to perform local authentication in the local network, wherein the local key derived by the home authentication center for the local network matches the local key derived by the UICC application for the local network.

2. Method according to claim 1, said method comprising, as a preliminary step, a step of, for the authentication center, provisioning the UICC application of the subscriber with a list of identifiers of local networks where the subscriber is authorized to access, and, when an authentication is required in a given local network, for the UICC application, a step of checking the presence of the local network's identifier in the list.

3. Method according to claim 1, wherein, once the local key is derived by the UICC application, the method further comprises the step of storing the local key for this local network and the step of checking the presence of a stored local key for the local network's identifier.

4. A home subscriber server comprising non-transitory memory, an authentication center and hosted in a home network, said authentication center storing a subscriber key per subscriber application, said subscriber key being dedicated to the authentication of a subscriber within any local networks having an agreement with home network's operator, said authentication center having a key derivation function to derive the subscriber key in local keys, one for each local network the subscriber is authorized to access, said authentication center having provisioning resources to provision each local network the subscriber is authorized to access with its own local key, and to provision UICC application of subscriber with own subscriber key, with the key derivation function and with an algorithm to perform local authentication, wherein the authentication center is configured to derive a local key for a particular local network using the key derivation function and the subscriber key, wherein the local key derived by the authentication center for the particular local network matches a local key derived by the UICC application for the particular network using the key derivation function and the subscriber key, wherein the authentication process uses a sequence number mechanism, and wherein, while deriving local keys, for the authentication center and for the UICC application, a local array of sequence numbers is associated to each derived local key.

5. A non-transitory computer-readable medium encoded with a UICC application provided with a subscriber key, said subscriber key being dedicated to the authentication of a subscriber within any local networks having an agreement with the home network, a key derivation function and an algorithm to perform local authentication, said UICC application being further adapted to receive a network identifier from a local network and to use this network identifier, the key derivation function and the subscriber key to derive a local key in the UICC application of the subscriber, the UICC application further being adapted to use the derived local key in the algorithm to perform local authentication in the local network, wherein the local key derived by the UICC application for the local network matches a local key derived by an authentication center using the key derivation function and the subscriber key, wherein the authentication process uses a sequence number mechanism, and wherein, while deriving local keys, for the authentication center and for the UICC application, a local array of sequence numbers is associated to each derived local key.

* * * * *